United States Patent
Starke

(10) Patent No.: US 7,923,096 B2
(45) Date of Patent: Apr. 12, 2011

(54) IMPULSE-ABSORBING STRUCTURAL COMPONENT

(75) Inventor: Peter Starke, Ottobrunn (DE)

(73) Assignee: EADS Deutschland GmbH, Ottobrunn (DE)

( * ) Notice: Subject to any disclaimer, the term of this patent is extended or adjusted under 35 U.S.C. 154(b) by 192 days.

(21) Appl. No.: 12/191,753

(22) Filed: Aug. 14, 2008

(65) Prior Publication Data

US 2009/0047482 A1 Feb. 19, 2009

(30) Foreign Application Priority Data

Aug. 16, 2007 (DE) .......................... 10 2007 038 634

(51) Int. Cl.
*B32B 3/28* (2006.01)
*B64D 7/00* (2006.01)
*B64C 5/00* (2006.01)

(52) U.S. Cl. .......... 428/178; 428/72; 428/182; 428/212; 428/911; 244/121; 244/123.12; 89/36.11

(58) Field of Classification Search .................... 428/72, 428/178, 182, 212, 911; 89/36.02, 36.11; 244/121, 123.12

See application file for complete search history.

(56) References Cited

U.S. PATENT DOCUMENTS

| 4,201,819 A * | 5/1980 | Schenz .......................... 428/172 |
| 2004/0237763 A1 * | 12/2004 | Bhatnagar et al. ........... 89/36.02 |
| 2005/0281987 A1 | 12/2005 | Starke |

FOREIGN PATENT DOCUMENTS

| DE | 101 29 576 A1 | 1/2003 |
| DE | 10 2004 029 485 A1 | 1/2006 |

* cited by examiner

*Primary Examiner* — Donald Loney
(74) *Attorney, Agent, or Firm* — Crowell & Moring LLP

(57) ABSTRACT

An impulse-absorbing structural component, particularly for an aircraft, has an impulse-absorbing layer and a covering layer applied thereto. The impulse-absorbing layer is made of a material that has a higher capacity for elongation at its breaking point than does the covering layer, and has a regular pattern of elevations and depressions. If a mass impacts on the covering layer, an intercept bag forms in the impulse-absorbing layer, and absorbs the kinetic energy of the mass. Viewed in the direction of the spread of the intercept bag, the structural component has structure beyond the impulse-absorbing layer, such that the formation of the intercept bag can take place without further interaction with the structural component.

8 Claims, 5 Drawing Sheets

IMPULSE-ABSORBING STRUCTURAL COMPONENT

BACKGROUND AND SUMMARY OF THE INVENTION

This application claims the priority of German patent application number 10 2007 038 634.8, filed Aug. 16, 2007, the disclosure of which is expressly incorporated by reference herein.

The present invention relates to an impulse-absorbing structural component for an aircraft.

German patent document DE 101 29 576 A1 discloses a structural element with an energy-absorbing layer inserted between two covering layers, in which at least one covering layer is load-bearing. The planar energy-absorbing layer is connected to the covering layers only at the edges, and has a higher elongation in case of a break than the covering layers. This arrangement has the disadvantage that, although it can absorb impulses, it has either an increased weight with the same strength, or a reduced strength with the same weight. Because the energy-absorbing layer is accommodated between the covering layers, the latter experience a notch effect, particularly under a load. The energy-absorbing layer which is used is dry or low-resin aramid woven fabric or PBO, which is connected to a load-bearing shell. This means that tensile forces cannot be transmitted transversely to the plane of the component, so that it is at risk under certain operating loads. Moreover, the two covering layers may also arch apart in response to compressive forces which may occur in the plane of the covering shells.

German patent document DE 10 2004 029 485 B1 discloses an impulse-absorbing structural component for an aircraft with two covering layers and an intermediate layer disposed therebetween. The material of the intermediate layer is selected so that it has a greater elongation at break than do the two covering layers. The intermediate layer extends in an alternating manner between the covering layers such that, should a mass impact on it, an intercept bag forms which dissipates the kinetic energy of the mass. This component, however, has the disadvantage that it is very expensive to manufacture. Moreover, tests have shown that the functional performance of the intercept bag is in some cases limited, as tears can occur in the intercept bag in a particular case.

One object of the present invention is therefore to provide an impulse-absorbing structural component which can be produced with a low manufacturing expenditure, and which assures a high degree of reliability.

This and other objects and advantages are achieved by the impulse absorbing structure component according to the invention, which comprises a three-dimensional impulse-absorbing layer having a regular pattern of elevations and depressions. A covering layer is applied to the elevations of the impulse-absorbing layer, while the other areas of the impulse-absorbing layer are raised from the covering layer. The material of the impulse-absorbing layer has a greater stretching or elongation at its breaking point than does the covering layer. Should a mass impact on the covering layer, an intercept bag which forms in the impulse-absorbing layer dissipates the kinetic energy of the mass.

Viewed in the direction of the spread of the intercept bag, the structural component according to the invention has an open structure after the impulse-absorbing layer, such that the formation of the intercept bag can take place without interaction with elements of the structural component. It is therefore impossible for the intercept bag to be damaged, so that its functional performance is not limited.

The covering layer serves in particular to absorb and transmit the operating loads and to guarantee the dimensional stability of the component, and therefore is of a higher strength than the impulse-absorbing layer. However, the impulse-absorbing layer also contributes significantly through its design to the stiffness of the component.

The thickness of the covering layer can in particular be between 3 and 5 mm in order to make the structure sufficiently strong. Advantageously, it is made of a high strength carbon-fiber-reinforced plastics material (CFK). The fibrous material can in this respect be both unidirectional or in the form of woven fabric or knitted fabric.

The impulse-absorbing layer advantageously consists of a glass-fibre-reinforced plastics material (GFK) of a high elongation at break. In this case the fibrous material is advantageously in the form of woven fabric or knitted fabric. The thickness of the impulse-absorbing layer is preferably in the range of 0.5-1 mm.

Epoxy resins and thermoplastics in particular are suitable as matrix materials for the above-mentioned layers as well as for all the other fiber-reinforced layers which are described in this patent application.

In a particularly advantageous embodiment, a further layer of the same form is applied to the impulse-absorbing layer. In other words: this results in a three-dimensional total layer which comprises elevations and depressions and consists of two sub-layers, namely the impulse-absorbing layer and the further layer, the further layer having a lower elongation at break than the impulse-absorbing layer. The further layer is in this case disposed between the covering layer and the impulse-absorbing layer. It serves in particular to increase the stiffness of the component and can correspond to the covering layer with regard to the materials used and their elongation at break.

In this respect the further layer is preferably of a layer thickness of 0.5-1.5 mm. It consists in particular of a carbon-fiber-reinforced plastics material (CFK) of high strength. Here the fibrous material can be both unidirectional or multidirectional and is in the form of woven fabric or knitted fabric.

In a configuration of this kind the impulse-absorbing layer can have the same properties as in the case of the construction described above without a further layer. That is, it is in particular of a thickness of 0.5-1.0 mm and advantageously consists of a glass-fiber-reinforced plastics material (GFK) of a high elongation at break, with the fibrous material being in particular in the form of woven fabric or knitted fabric.

The impulse-absorbing layer and optionally the further layer disposed thereon may be of wavy formation, in which case, in addition to a rounded form (e.g. semicircular, sinusoidal), the individual wave crests and wave troughs can also be of triangular or trapezoidal formation.

In further constructions the impulse-absorbing layer is of knob-shaped or eggbox-shaped formation.

The structural component according to the invention prevents damage to functionally essential components of aircraft, land vehicles or watercraft or tools, machines, systems and building parts as a result of the transmission of impulses through the impact of birds, hydrodynamic pressure surges or pressure waves—in particular through explosions.

Other objects, advantages and novel features of the present invention will become apparent from the following detailed description of the invention when considered in conjunction with the accompanying drawings.

DETAILED DESCRIPTION OF THE DRAWINGS

Figure 1:
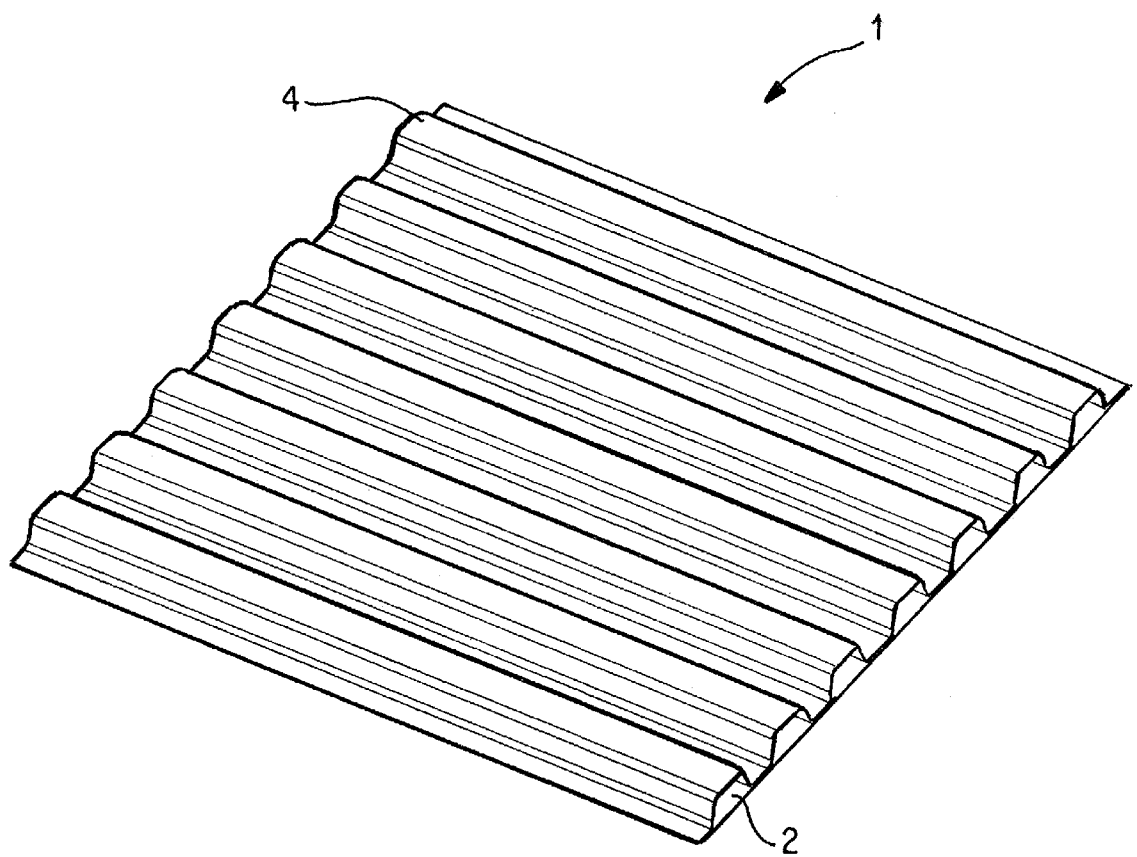
FIG. 1 shows a perspective representation of an embodiment of the impulse-absorbing structural component according to the invention in the non-deformed form, which is formed as a plane component; the impulse-absorbing layer is of wavy formation with a trapezoidal wave cross-section.

As can be seen from FIG. 1, for example, the structural component 1 according to the invention is formed from a covering layer 2 of CFK and an impulse-absorbing layer 4 of GFK disposed on the latter. The impulse-absorbing layer 4 is three-dimensional in the form of a continuously plane wave, with the individual wave crests and wave troughs being trapezoidal in cross-section. The covering layer 2 is fastened to the impulse-absorbing layer 4 by gluing on the side of the trapezium which faces the covering layer. Gluing can take place during the manufacture of the two layers 2, 4, namely before the matrix material is cured.

The material of the impulse-absorbing layer is selected so that it has a greater elongation at its breaking point than the covering layer 2. The covering layer 2 faces the side from which the impact of a mass is to be expected. The impulse-absorbing layer 4 forms the rear termination of the structural component 1, so that the intercept bag forming upon the impact of a mass part can form and spread uninfluenced by other structural elements. There is therefore no risk of damage to the intercept bag due to a collision with further structural elements.

Figure 2:
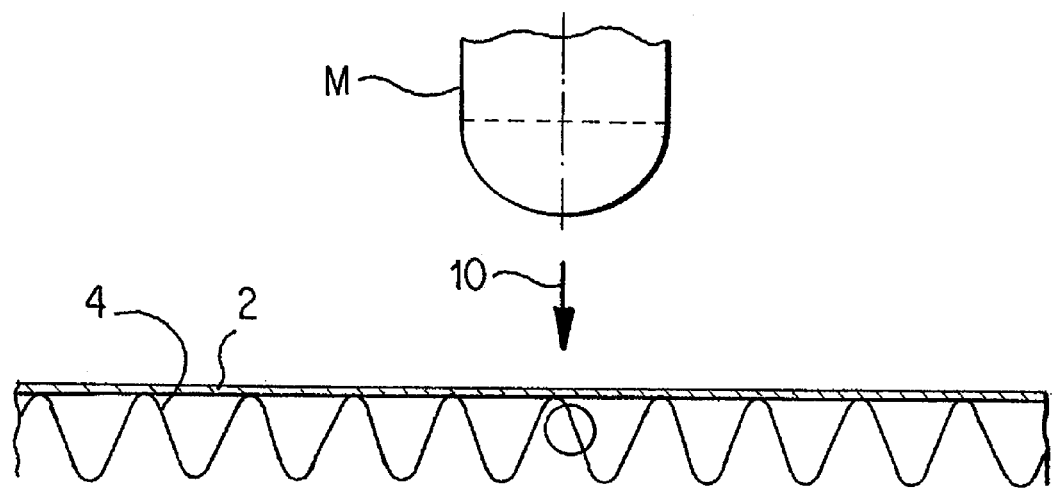
FIG. 2 is a cross sectional view of a further embodiment of the structural component according to the invention, in its non-deformed state (prior to the impact of a mass thereon), with the impulse-absorbing layer being of wavy formation, with a rounded wave cross-section.
Figure 3:
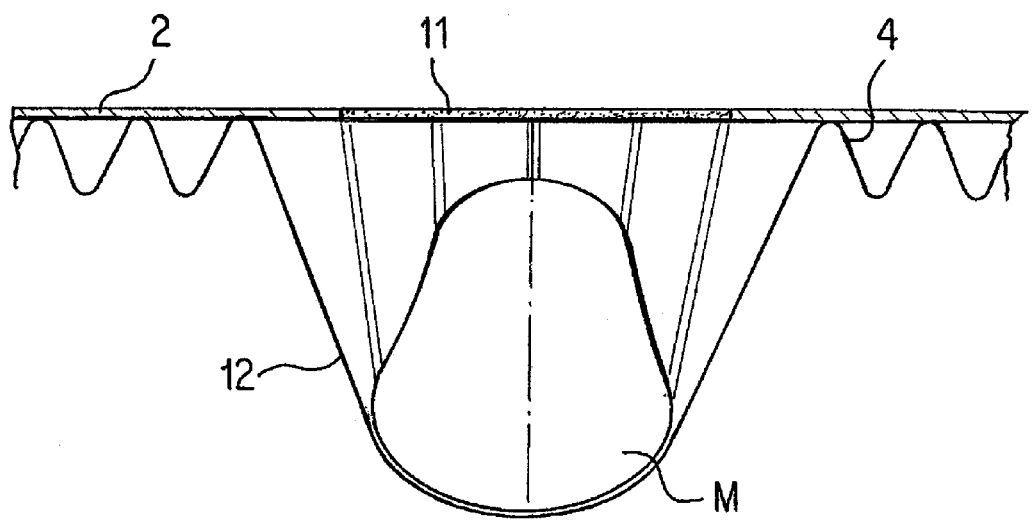
FIG. 3 is a cross sectional view of the structural component according to FIG. 2 following the impact of a mass thereon.
Figure 4:
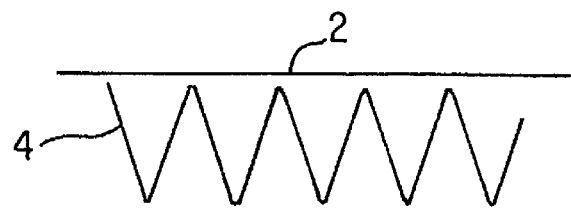
FIG. 4 is a schematic sectional representation of a detail of a further embodiment of a plane structural component in a non-deformed state, in which the impulse-absorbing layer is of wavy formation with a triangular wave cross-section.
Figure 5:
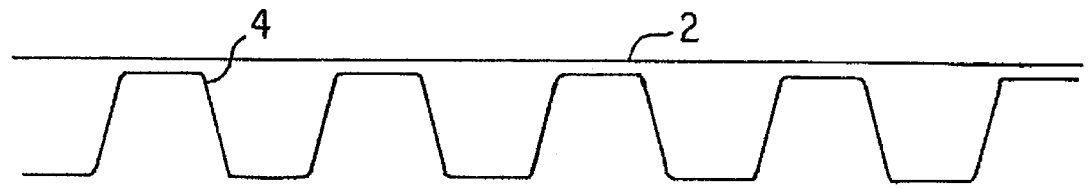
FIG. 5 is a schematic sectional representation of a detail of a further embodiment of a plane structural component in a non-deformed state, in which the impulse-absorbing layer is of knob-shaped formation.
Figure 6:
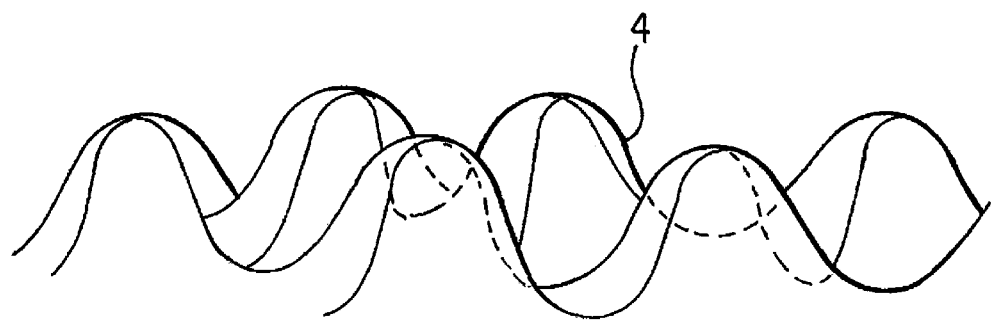
FIG. 6 is a schematic perspective representation of a detail of a further embodiment of a plane structural component in a non-deformed state, in which the impulse-absorbing layer is of eggbox-shaped formation.

Various designs of the impulse-absorbing layer 4 are represented in FIG. 2, FIG. 4, FIG. 5 and FIG. 6. In a first alternative the impulse-absorbing layer 4 can be of wavy formation (FIGS. 2 to 4). Here the cross-sections of the individual waves can be rounded (FIG. 2, FIG. 3) or triangular (FIG. 4). In further embodiments the impulse-absorbing layer can also have knob-shaped elevations regularly distributed over the entire surface (FIG. 5) or be constructed like an egg crate (FIG. 6).

Due to the shaping of the impulse-absorbing layer 4 as well as its greater elongation at the breaking point compared with the covering layer 2, the deceleration distance is increased in the event of a mass M acting on the structural component. At the same time the structural component or the impulse-absorbing layer 4 can transmit thrust forces from operating loads during normal operation.

The mass M is generally a three-dimensional body which moves at a significant relative speed with respect to the structural component 1 in the event of an impact. The mass M can be a solid part or a solid component part with a fixed or an indeterminate structure or form. The mass part can also be a quantity of a fluid (i.e., a gas or a liquid). When employing the component according to the invention for an aircraft, the fluid can be, for example, a bird, a projectile, a fuel such as propellant or hydraulic fluid. The fuel can in this case act on the structural component outside of the aircraft structure or inside it. The latter may be the case, for example, if propellant inside a propellant tank exerts an impulse on the impulse-absorbing structure, which may be the tank wall, on account of the aircraft movement.

Figure 7:
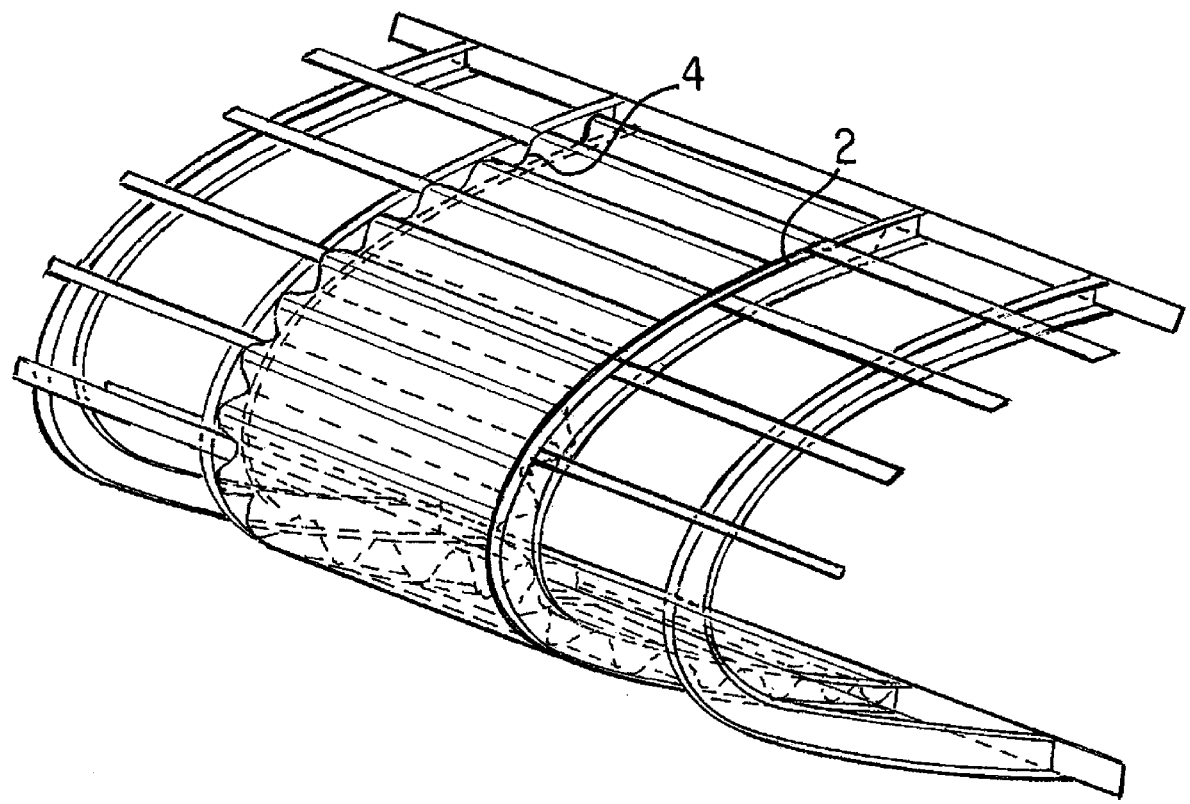
FIG. 7 is a perspective wireline representation of a further embodiment of the structural component according to the invention, as a curved front shell of an aircraft wing.

The structural component 1 according to the invention may also comprise further elements or component parts such as, for example, stiffening ribs or stringers (cf. FIG. 7).

The mode of operation of the structural component 1 according to the invention upon the impact of a mass M is described in the following on the basis of FIGS. 2 and 3: It is assumed that the mass M moves in a movement direction 10 up to the structural component 1 according to the invention (FIG. 2). The elongation at the breaking point of the covering layer 2 facing the approaching mass part M is lower than the elongation at break of the impulse-absorbing layer 4.

When the mass M strikes, the elongation at break of the covering layer 2 is exceeded and thus some of the kinetic energy of the mass part M is dissipated. With an assumed maximum impulse of the mass part M, the covering layer 2 is designed so that it is pierced. An opening 11 forms (FIG. 3) due to the failure of the covering layer 2. As a result, the mass part M acts on the impulse-absorbing layer 4. On account of the form and the higher elongation at break of the impulse-absorbing layer 4, the latter is elastically deformed without, however, breaking. The connection between the covering layer 2 and the impulse-absorbing layer 4 comes loose in a controlled manner, so that an intercept bag 12 forms. By way of progressive loosening of an increasing number of connections between the covering layer 2 and the impulse-absorbing layer 4, the intercept bag 12 widens more and more and the kinetic energy is increasingly dissipated.

The component parts of the structural component (i.e., the covering layer and the impulse-absorbing layer 4) are designed in terms of their form and their elongation at the breaking point for a predetermined maximum impulse, so that the kinetic energy of the mass part M is completely dissipated; or at least it is reduced to such an extent that, for areas or systems lying behind the structure, the damage does not exceed a predetermined extent.

Figure 8:
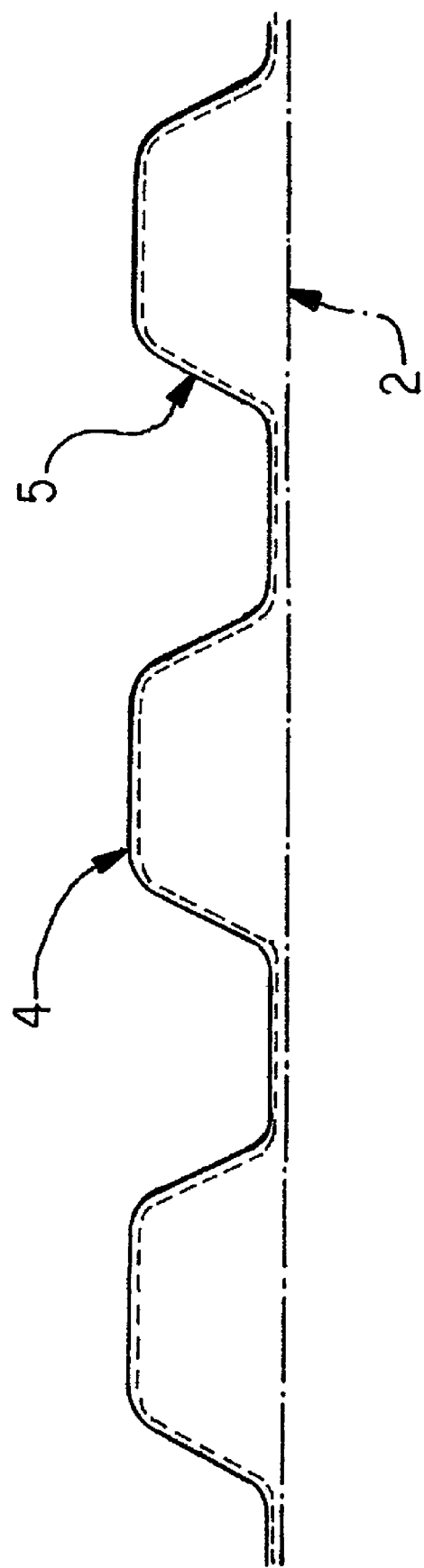
FIG. 8 is a schematic sectional representation of a detail of a further embodiment of the structural component according to the invention in a non-deformed state, in which an additional layer is disposed on the impulse-absorbing layer.

In a further construction according to FIG. 8 a further layer 5 is applied to the impulse-absorbing layer 4 (on its side facing towards the covering layer 2), and thus has the same form as the impulse-absorbing layer. This further layer 5 corresponds substantially to the covering layer 2 with regard to the materials used and their elongation at break and strength. It serves in particular to increase further the component stiffness without impairing the function of the impulse-absorbing layer. For this purpose it advantageously consists of CFK.

In this construction the layer thickness of the covering layer 2 can be smaller (1-2 mm) than in the case of the construction described above (3-4 mm), which does not comprise this further layer 5.

All the constructions represented in FIGS. 1 to 7 and relating to constructions without the further layer 5 can also be modified in such a way that the represented three-dimensional, non-plane layer 4 is of two-layer construction, consisting of an impulse-absorbing layer of GFK with a high elongation at break, as described above, and the further layer preferably of CFK with a low elongation at break.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An impulse-absorbing structural component of an aircraft, said structural component comprising:
    an impulse-absorbing layer; and
    a covering layer applied to the impulse-absorbing layer, said covering layer being made of a carbon-fiber referenced plastics material; wherein,
    the impulse-absorbing layer is made of a glass-fiber reinforced plastics material, and has a higher elongation at a breaking point than the covering layer;
    the impulse-absorbing layer has a regular pattern of elevations and depressions, whereby upon impact of a mass on the covering layer, an intercept bag forms in the impulse-absorbing layer and dissipates kinetic energy of the mass; and
    viewed in the direction of the spread of the intercept bag, the structural component has an open structure beyond the impulse-absorbing layer, such that the formation of the intercept bag can take place without further interaction with the structural component.

2. The impulse-absorbing structural component according claim 1, wherein the covering layer has a thickness of between 3 and 5 mm.

3. The impulse-absorbing structural component according to claim 1, wherein a further layer, having the same form but a lower elongation at the breaking point is arranged on the impulse-absorbing layer.

4. The impulse-absorbing structural component according to claim 3, wherein the further layer is disposed between the covering layer and the impulse-absorbing layer.

5. The impulse-absorbing structural component according to claim 1, wherein the impulse-absorbing layer comprises one of a knitted fabric and a woven fabric.

6. The impulse-absorbing structural component according to claim 4, wherein the further layer is formed of a carbon-fiber-reinforced plastics material.

7. The impulse-absorbing structural component according to claim 1, wherein the impulse-absorbing layer has wavy formation, with a trapezoidal wave cross-section.

8. An impact absorbing structural component of an aircraft, said structural component comprising:
    an impact absorbing layer having an undulating structure that comprises a pattern of elevated portions and depressed portions;
    a cover layer that is detachably attached to the impact absorbing layer along each of said elevated portions, on a side of said impact absorbing layer to be exposed to an impact by a mass; wherein,
    the side of the impact absorbing layer opposite the side on which the cover layer is attached is without any further layers;
    the cover layer is made of a carbon-fiber reinforced plastics material; and
    the impact absorbing layer is made of a glass-fiber reinforced plastics material that has a greater capacity to stretch prior to reaching a braking point than the carbon-fiber reinforced plastics material of which the covering layer is made.

* * * * *